(12) United States Patent
Cyrus et al.

(10) Patent No.: US 8,753,050 B2
(45) Date of Patent: Jun. 17, 2014

(54) TRANSPORT APPARATUS

(75) Inventors: Bernd Cyrus, Aurich (DE); Frank Lülker, Aurich (DE)

(73) Assignee: Aloys Wobben, Aurich (DE)

(*) Notice: Subject to any disclaimer, the term of this patent is extended or adjusted under 35 U.S.C. 154(b) by 125 days.

(21) Appl. No.: 13/263,700

(22) PCT Filed: Apr. 8, 2010

(86) PCT No.: PCT/EP2010/054657
§ 371 (c)(1),
(2), (4) Date: Jan. 23, 2012

(87) PCT Pub. No.: WO2010/115964
PCT Pub. Date: Oct. 14, 2010

(65) Prior Publication Data
US 2012/0114443 A1    May 10, 2012

(30) Foreign Application Priority Data

Apr. 9, 2009  (DE) .......................... 10 2009 017 068
Jul. 23, 2009  (DE) .......................... 10 2009 034 329

(51) Int. Cl.
*B60P 7/08*  (2006.01)

(52) U.S. Cl.
USPC .............................. 410/45; 410/44; 410/120

(58) Field of Classification Search
USPC ......... 410/34, 44, 45, 120; 105/355; 280/404; 414/460
See application file for complete search history.

(56) References Cited

U.S. PATENT DOCUMENTS

| 6,286,435 | B1 | 9/2001 | Kassab et al. ................. 105/171 |
| 7,374,405 | B2 | 5/2008 | Wobben .................... 416/244 R |
| 7,591,621 | B1* | 9/2009 | Landrum et al. ................ 410/45 |
| 8,353,523 | B2* | 1/2013 | Pedersen |
| 2006/0251517 | A1 | 11/2006 | Grabau ......................... 416/202 |
| 2006/0285937 | A1 | 12/2006 | Wobben .......................... 410/45 |
| 2007/0189895 | A1 | 8/2007 | Kootstra et al. .................. 416/9 |
| 2009/0020445 | A1 | 1/2009 | Koike |

FOREIGN PATENT DOCUMENTS

| CN | 101076664 A | 11/2007 |
| DE | 3604496 | 8/1987 |
| EP | 1813473 | 8/2007 |
| WO | 2006/000230 | 1/2006 |

* cited by examiner

*Primary Examiner* — Stephen Gordon
(74) *Attorney, Agent, or Firm* — Seed IP Law Group PLLC

(57) ABSTRACT

The present disclosure concerns a transport apparatus for transporting a rotor blade of a wind power installation on a transport vehicle comprising a plurality of successively arranged and pivotably interconnected wagon elements. The transport apparatus may include a blade root carrier adapted to attach to a first wagon element for carrying the rotor blade in a region of a rotor blade root thereof on the first wagon element, a central carrier adapted to attach to a second wagon element for carrying the rotor blade in a central region thereof on the second wagon element, and a blade tip damper for making an elastic connection between a third wagon element and the rotor blade in a region of a rotor blade tip thereof for damping oscillations of the rotor blade tip.

8 Claims, 16 Drawing Sheets

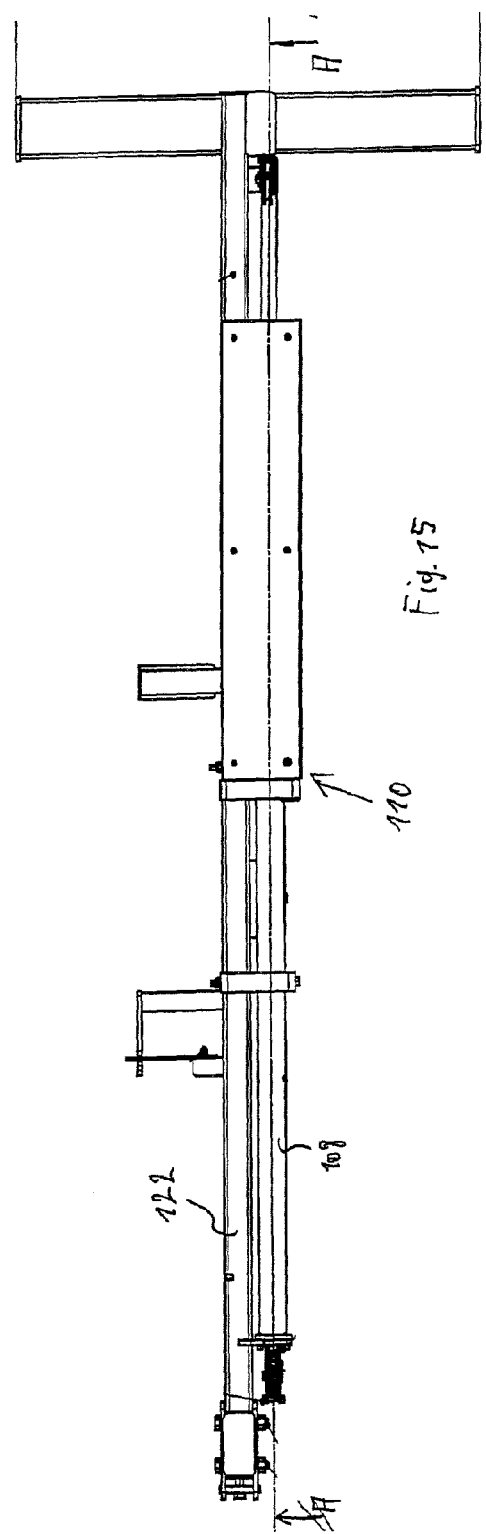

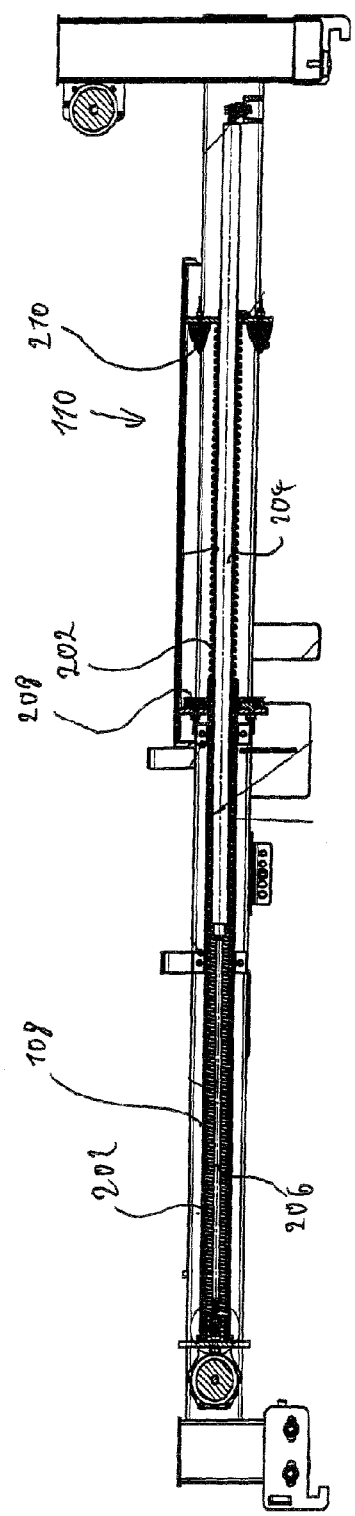

TRANSPORT APPARATUS

BACKGROUND

1. Technical Field

The present disclosure concerns a transport apparatus for transporting at least one rotor blade of a wind power installation. In addition the present disclosure concerns an aid for improving the transport of a rotor blade of a wind power installation. In addition the present disclosure concerns a transport arrangement which transports at least one rotor blade of a wind power installation.

2. Description of the Related Art

Modern wind power installations are nowadays frequently a so-called horizontal axis rotor with a hub which generally faces into the wind (a windward rotor) and to which one or more and in particular three rotor blades are fixed. Such a rotor blade has—and this will also be taken as the basic starting point hereinafter—a rotor blade root for directly or indirectly fixing it to the hub. At the side remote from the rotor blade root the rotor blade has a rotor blade tip. In the region between the rotor blade root and the rotor blade tip the rotor blade is at least predominantly flat and has two sides which can be referred to as the suction side and the pressure side. In addition there are two edges which can also be referred to as the leading edge and the trailing edge. In accordance with its definition the leading edge faces substantially into the wind and is generally rounded whereas in normal operation of the wind power installation the trailing edge faces substantially away from the wind and is very thin and sometimes even a sharp edge to achieve an advantageous flow break-away effect.

Such rotor blades are nowadays of lengths of up to 60 m and greater lengths are certainly to be expected. Lengths of 35 to 40 m are nowadays certainly usual.

As state of the art, attention is generally directed at this point to the following documents: DE 36 04 496 A1, U.S. Pat. No. 7,374,405 B2, EP 1 813 473 A2, U.S. Pat. No. 6,286,435 B1 and WO 2006/000230 A1.

As far as possible such a rotor blade can be fixed and transported on a special transporter like a low loader on the corresponding load surface. If the length of the transporter is not sufficient the use of a transporter with a trailer can be envisaged. In that case the rotor blade is fixed and supported with its rotor blade root in the region of the tractor and the trailer is used in the region of the rotor blade tip. The trailer should then flexibly adapt to resulting movements of the rotor blade in the transport process. Such a trailer is therefore coupled to the tractor only by way of the item being transported—in this case the rotor blade.

The use of a transport vehicle with trailer is extremely complicated and is also often undesirable for other reasons. Particularly for transporting a rotor blade on the railways the use of a vehicle with a plurality of successively arranged and pivotably interconnected wagon elements is desired.

Such wagon elements, in particular railroad wagon cars, while moving, particularly on bends, perform movements relative to each other which do not have to correspond to the movements of a rotor blade supported thereon for transport thereof. In other words, to transport it, a rotor blade which is substantially longer than each of the specified wagon elements cannot be readily fixed at the same time on a plurality of wagon elements. The movement of the wagon elements relative to each other could lead to considerable stresses on the rotor blade and it could be damaged.

For that reason, a rotor blade can be arranged by means of special carriers which are respectively arranged on a wagon element, but in that case allow relative movements between the fixed rotor blade and the respective wagon element. Thus the rotor blade can be arranged with the rotor blade root on a carrier on a wagon element, that carrier permitting a rotary movement between the rotor blade and the wagon element. A further carrier can carry the rotor blade in a central region on another wagon element, in which case that second carrier permits both a rotary movement and also a translatory movement relative to that wagon element. In that respect it is to be noted that the wagon element on which the rotor blade root is mounted and the wagon element on which said middle region is supported does not have to be directly adjacent wagon elements but it is rather also possible to arrange a further wagon element between those two.

In that case the rotor blade tip is floating freely in space and is basically held only by the rotor blade itself. While travelling and depending on the respective boundary conditions involved, in particular the route but also the speed of travel, the rotor blade tip will move in relation to a wagon element, in the region of which it is for example disposed. Although it is assumed that at least when the situation is considered as virtually stationary, the movement of the rotor blade tip relative to said wagon element is so slight that the tip does not exit the internal region of the wagon element which is also referred to as the railway loading gauge (i.e., the region in which all items being transported have to be disposed when being transported), that nonetheless cannot be guaranteed because, for example, possible oscillation amplitudes to be expected are not accurately known.

BRIEF SUMMARY

Embodiments of the present invention eliminate the above disadvantages as far as possible, and in particular improve the transport of rotor blades of wind power installations, or at least an alternative solution is provided.

According to some embodiments of the present invention a blade tip damper is provided. Such a blade tip damper is provided for elastically connecting a rotor blade of a wind power installation in the region of the rotor blade tip to a transport vehicle. That is effected for damping oscillations of the rotor blade tip upon transport of the rotor blade. The blade tip damper includes an anchoring portion which is to be fastened to the transport vehicle and in particular to a wagon element of a multi-link transport vehicle. In addition there is provided a gripping portion for fixing to the rotor blade in the region of the rotor blade tip. Finally the blade tip damper also has a damping portion for producing an elastic damped connection or a connection having a damping action between the anchoring portion and the gripping portion. In that case the blade tip damper is so designed that a force is transmitted between the anchoring portion and the gripping portion by way of a tensile stress. The blade tip is thus not fixedly connected to the anchoring portion and thus to the transport vehicle, but rather the connection is of a free configuration such that basically only a pulling force and thus a force in only one direction is exerted on the rotor blade in its rotor blade tip region. In particular no compression or thrust forces are to be transmitted to the rotor blade in that region. Transverse forces can also only be limitedly transmitted. Rather, the blade tip damper permits a movement transversely relative to said pulling force. It will be appreciated that this does not exclude supplemental means which could transmit a compression or thrust force possibly being arranged in the region of the rotor blade tip or in the proximity thereof.

The connection between the anchoring portion and the gripping portion and thus between the transport vehicle or wagon element in question and the rotor blade tip is in that case elastic and the transmission of force is correspondingly elastic. The blade tip damper therefore differs essentially from a clamping means as it provides an elastic connection and in addition also has a damping effect. Preferably the pulling force is in this case also exerted only in one direction on the rotor blade.

Preferably the damping portion has a spring element and a damping means and/or a non-linear travel force characteristic. The elastic behavior of the connection between the anchoring portion and the gripping portion can be achieved by the spring element, for example a spring. The damping action is correspondingly afforded by a damping means. Preferably the travel force characteristic of this connection is non-linear. If during a transport process the rotor blade tip moves relative to the anchoring portion against the tensile stress, the tensile stress increases with a corresponding movement of the rotor blade tip, the increase in that counteracting force increasing in over-proportional relationship with the travel. That can be effected by a non-linear spring characteristic or it can also take place abruptly, for example by a spring being combined with a rubber element and optionally still further elements. Thus, for example, a counteracting force can firstly be produced by a corresponding spring stressing, until, with an increasing travel in respect of the rotor blade movement—clearly it would also be possible to refer to a distance between the rotor blade tip and the anchoring portion—for example the spring element reaches a limit value, such as for example its maximum upsetting occurs, whereupon then said rubber element comes into operation, which in comparison with the spring element has a markedly stiffer spring action or a higher spring constant.

Further preferably the damping portion has an adjustable and/or directionally dependent braking element. Such a braking element can also be interpreted as a kind of non-linear damping means. A brake or a braking force only counteracts a movement, without itself however actively initiating a movement. Thus, such a braking element opposes the movement of the rotor blade tip in one direction, but does not move the rotor blade tip back itself. Preferably the damping element and in particular the described braking element is adjustable in its damping characteristic or its braking action. That is to be proposed not only for an adjustment to the corresponding rotor blade, but also for taking account of the specific loading condition and also for further boundary conditions such as the intended transport route or transport speed or also the prevailing winds at the date of the transport process.

In accordance with an embodiment it is proposed that, to transmit a tensile stress, there is provided a cable and optionally at least one direction-changing means, in particular at least one direction-changing roller, for deflecting the cable. The use of a cable permits simple force transmission which takes account of the fact that basically there is only a tensile stress to be transmitted. In principle it is also possible to use means equivalent to a cable such as for example a chain or also a wire cable or a belt. Optionally, one or more direction-changing means such as direction-changing rollers are used. In that way it is possible to extend the length of the transmission path for transmission of the tensile stress. The damping means therefore does not necessarily have to have space between the anchoring portion and the rotor blade tip. In addition, it is also possible to achieve an action along the lines of a block-and-tackle arrangement by the use of a direction-changing roller. In addition it is possible, in spite of the use of a tensile stress between the anchoring element and the rotor blade tip, to use a damping element, in particular also a spring means, which is designed for a compression loading.

In accordance with still a further embodiment it is proposed that the blade tip damper is characterized in that the gripping means is adapted to be fixed to two substantially flat sides of the rotor blade, in particular the pressure side and the suction side, in such a way that contact is avoided between the blade tip damper and the trailing and/or leading edge of the rotor blade. In that respect also a blade tip damper differs from a simple clamping means. That provides that in particular a thin and delicate trailing edge is not damaged by the use of a blade tip damper.

Preferably the blade tip damper is adapted in the appropriately mounted condition to allow a movement of the rotor blade tip relative to the anchoring portion of at least 10 cm, and in particular at least 30 cm.

The blade tip damper thus does not generally prevent movements of the rotor blade tip, but allows a certain degree of freedom which in particular corresponds to the relative movement of the rotor blade tip with respect to the transport element in question, when considering the situation without oscillations.

In addition there is proposed a transport apparatus according to one embodiment. The transport apparatus is provided for transporting a rotor blade of a wind power installation on a transport vehicle having a plurality of successively arranged and hingedly interconnected wagon elements, such as for example a plurality of goods wagons of a goods train on the railway. The transport apparatus includes a rotor blade carrier for fixing on a first wagon element for carrying the rotor blade of a rotor blade root on that first wagon element.

Such a rotor blade carrier is fixed according to requirements upon transport on the first wagon element, but is at least arranged thereon, and is fixed to the rotor blade in the region of the rotor blade root. For that purpose the flanges and/or other fixing devices on the rotor blade can also be used, with which the rotor blade is to be fixed to the rotor blade hub.

In addition there is provided a central carrier for arrangement and/or fixing on a second wagon element, which carries the rotor blade in a second region, that is to say between the rotor blade root and the rotor blade tip, and is thus carried in that region on the second wagon element. The rotor blade root carrier and also the central carrier or middle carrier can each be moved relative to the respective wagon element on which they are disposed. The possible movement can include a rotary movement, in particular about a vertical axis of rotation, and also a translatory movement, in particular in a horizontal plane, as well as a combination thereof. Basically the blade root carrier and the central carrier are provided and adapted to carry the rotor blade substantially alone.

In addition the transport apparatus includes a blade tip damper for making an elastic damped or dampened connection between a third wagon element and the rotor blade in the region of its rotor blade tip for damping oscillations of the rotor blade tip. The expression a damped or dampened connection is used to mean that in particular elastic relative movements occurring between the rotor blade tip and the third wagon element are damped or dampened. The blade tip damper thus has dissipative properties.

Preferably, a blade tip damper according to embodiments of the present invention is used and any functionalities will be apparent, inter alia, from the foregoing description relating to the foregoing blade tip damper.

Preferably the blade tip damper is adapted to be connected to a rotor blade in the region of its rotor blade tip to damp oscillations of the tip without supporting the rotor blade in that region. The blade tip damper thus essentially differs in its function from the blade root carrier and the central carrier which carry the rotor blade (at least in part) and in that case also carry a force due to the weight of the rotor blade and pass it to the wagon element in question. In contrast the blade tip damper is adapted to prevent excessively severe movements of the rotor blade tip without in that case supporting the blade.

Preferably the blade tip damper is adapted to produce a tensile stress between the rotor blade and the third vehicle element and/or the blade tip damper has a spring element for achieving a prestressing between the rotor blade and the third vehicle element. It is possible in that way to limit the movement of the rotor blade tip upon transport without a supporting element being required. By making use of a prestressing, the rotor blade tip can already be pulled in a direction, wherein such a direction is basically directed transversely relative to one of the sides, in particular a pressure side or a suction side. Such prestressing can be easily achieved by the connection of a spring element.

In accordance with an embodiment of the invention the blade root carrier has a counterweight. In that way the rotor blade can be arranged eccentrically in the region of its blade root in relation to a central axis of the transport vehicle which extends in the direction of travel. In that way it is possible on the one hand to take account of the overall shape of the rotor blade, and also a situation if a center of gravity of the rotor blade is not coincident with a geometrical center point of the rotor blade. The counterweight is thus provided to compensate for an eccentric arrangement of the corresponding center of gravity. Optionally the rotor blade root carrier has a displacement mechanism which is adapted to move the counterweight from a first position for transport of a rotor blade into a second position for travelling empty without a rotor blade, and vice-versa. The counterweight can thus be moved in a horizontal direction at least closer to the longitudinal axis of the transport vehicle for travelling empty, in order thus also to involve an advantageous weight distribution when travelling empty.

Preferably the transport apparatus is adapted to transport a rotor blade of a length of at least 25 m, in particular at least 35 m, and in particular the transport apparatus is thus adapted to transport such a long rotor blade which is carried on a plurality of railroad car wagons in a rail vehicle.

In addition there is proposed a transport arrangement including a transport apparatus according to embodiments of the present invention, a multi-link vehicle having at least a first and a second wagon element which are pivotably connected together, and a rotor blade of a wind power installation, that is fixed on the transport apparatus and is arranged in the region of its rotor blade root on the rotor blade carrier on the first wagon element and is supported thereon, is arranged in a central region on the central carrier on the second wagon element and is supported thereon, and in the region of its rotor blade tip is elastically connected by means of the blade tip damper to the second or a third wagon element. Such an arrangement of the rotor blade on a transport arrangement is also to be interpreted as a proper use of the transport apparatus. Such a transport arrangement is basically adapted to transport the rotor blade.

Preferably the rotor blade has a chord—in cross-section transversely relative to the longitudinal axis of the rotor blade, a line connecting the leading and trailing edges—which is inclined relative to the horizontal, in particular at an angle of 30 to 60° with respect to the horizontal plane and in particular an angle of 40 to 50° with respect to the horizontal plane. Oscillations of the rotor blade occur substantially transversely relative to that chord, that is to say in the direction of the two sides. If the rotor blade, and therefore the chord, is vertical, then basically only oscillation movements occur in the horizontal plane—if they occur at all—whereas in the case of a horizontally arranged rotor blade, that is to say with the chord horizontal, it is only necessary to reckon on vertical oscillation movements. The inclined arrangement thus affords a compromise between the two positions.

The discussion and description set forth in relation to the transport of a rotor blade are also—insofar as appropriate—of significance for the blade tip damper, the transport apparatus and the transport arrangement.

BRIEF DESCRIPTION OF THE SEVERAL VIEWS OF THE DRAWINGS

Embodiments of the present invention are described in greater detail hereinafter by means of examples with reference to the accompanying Figures.

FIG. 10 shows a side view of a gripping portion of a blade tip damper.

FIG. 11 shows a pressing portion arrangement of the gripping portion of FIG. 10 in a sectional view along section line A-A in FIG. 10.

FIG. 12 shows a further view of a gripping portion of a blade tip damper.

FIG. 13 shows a perspective view of a blade tip damper.

FIG. 14 shows a side view of a partial region of a blade tip damper.

FIG. 15 shows a plan view of the part of the blade tip damper of FIG. 14.

FIG. 16 shows a side view in section along section line A-A in FIG. 15 in relation to the part of the blade tip damper of FIG. 15.

FIG. 18 shows a further view of a direction-changing device as shown in

FIG. 17.

FIG. 19 shows a pulling element for use with a blade tip damper.

DETAILED DESCRIPTION

Figure 1:
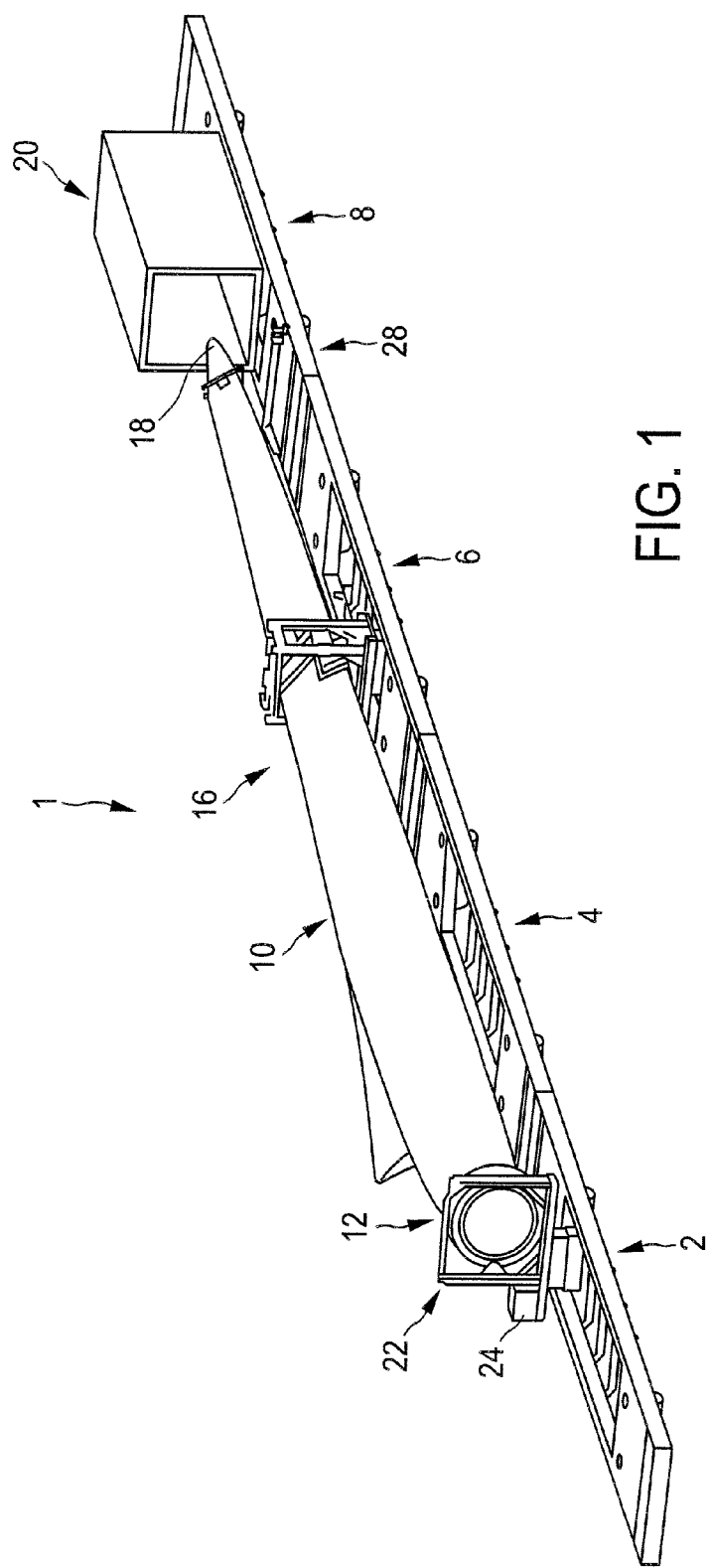
FIG. 1 shows a transport arrangement according to an embodiment of the invention.

The same references can denote identical but also similar components. The transport arrangement 1 in FIG. 1 includes four wagon elements 2, 4, 6 and 8 of a transport vehicle such as a goods train, the portion of which is only diagrammatically shown here. A rotor blade 10 is arranged on the wagon elements 2, 4, 6 and 8 or in the region thereof and is supported there. In that case the rotor blade 10 is arranged in its root region 12 at a blade root carrier 22 on the first wagon element 2 and is supported there. In its central region 16 the rotor blade 10 is arranged by means of the central carrier 26 on the second wagon element 6 and is supported there. Also disposed between the first and second wagon elements 2, 6 is a further wagon element 4 which however only connects the first and second wagon elements 2, 6 and otherwise is not connected to the rotor blade 10.

The rotor blade tip 18 which has an angled rotor blade tip region is elastically connected with damping properties to the third wagon element 8 by way of the blade tip damper 28. In addition arranged on the third wagon element 8 is a box 20 which is only intended to illustrate a further item being transported on the third wagon element and in that respect gives an impression of the available space for the rotor blade to be transported.

Figure 2:
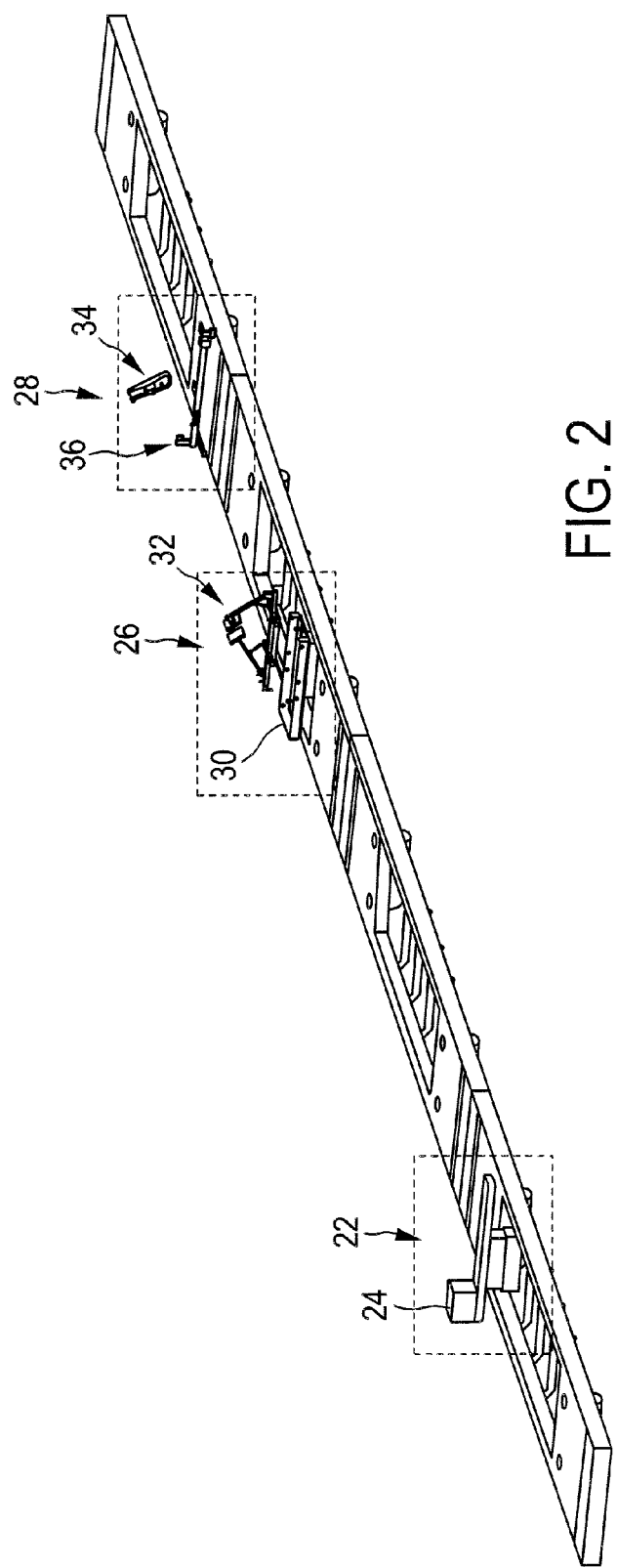
FIG. 2 shows a transport apparatus according to an embodiment of the invention on a plurality of coupled wagon elements.

FIG. 2 shows the blade root carrier 22, the central carrier 26 and the blade tip damper 28 in the same arrangement as in FIG. 1, with the rotor blade 10 having been omitted for the sake of clarity. In relation to the blade root carrier 22 it is also possible to see a counterweight 24 which permits an eccentric arrangement of the rotor blade root when being transported. The central carrier 26, besides a receiving means 30, has an additional support element 32. The blade tip damper 28 has a gripping portion 34 and a damping portion 36.

Figure 3:
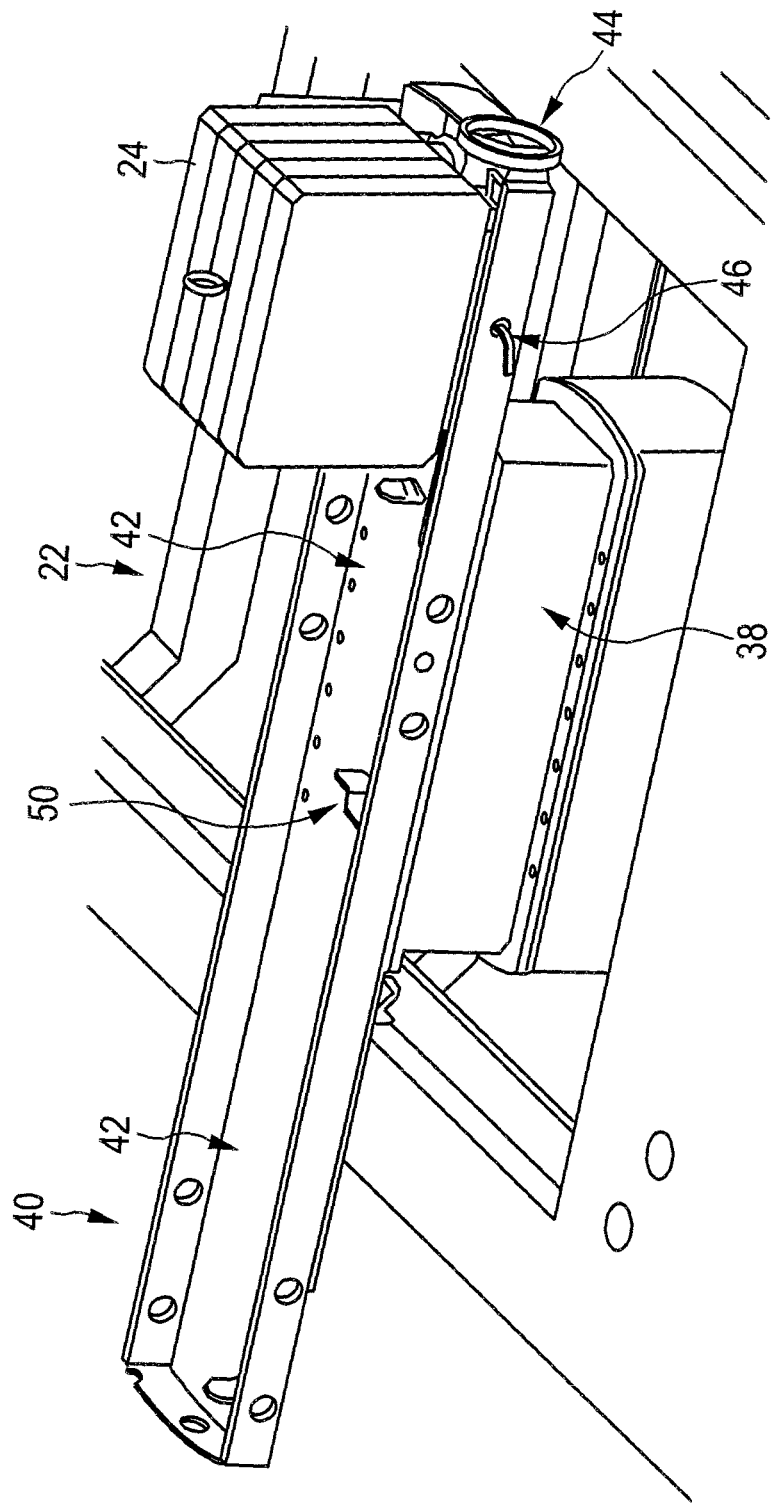
FIG. 3 shows a blade root carrier of a transport apparatus according to an embodiment of the invention in a position for transport of a rotor blade.

The blade root carrier 22 in FIG. 3 is arranged on a rotary stool 38. The structure has the blade root receiving means 40 on which anti-slip mats 42 are disposed to receive a rotor blade root which is fixed in a frame. Fixing of the blade root carrier 22 on the rotary stool 38 is effected by way of a multiplicity of screwthreaded bolts.

The counterweight 24 is arranged substantially on the blade root receiving means 40 to permit eccentric mounting of the blade root. It is to be observed that the perspective in FIGS. 3 and 4 is oppositely directed to the perspective in FIGS. 1 and 2.

Figure 4:
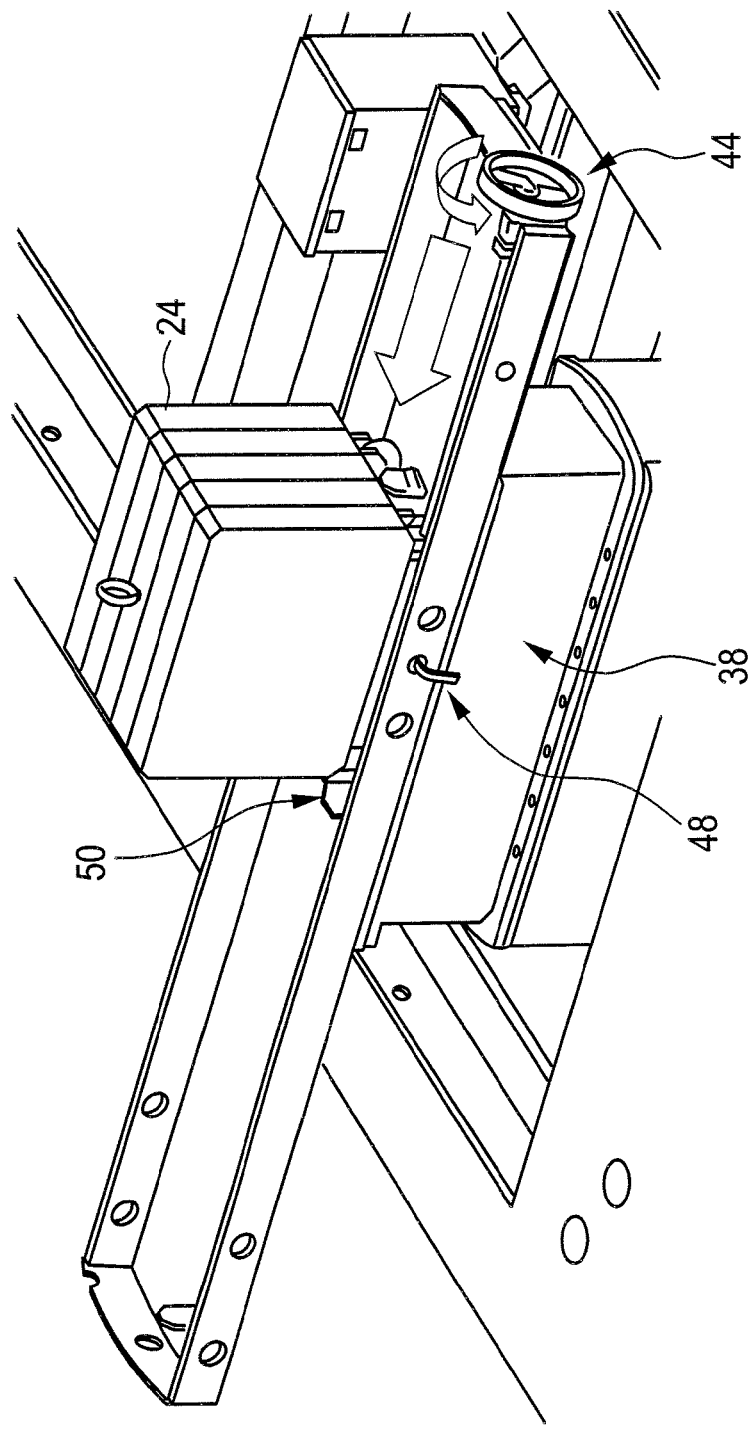
FIG. 4 shows the blade root carrier of FIG. 3 but in a position for travel when empty.

So that, after a rotor blade has been unloaded, the vehicle can then travel empty without a rotor blade, the counterweight 24 can be displaced from the FIG. 3 position into the FIG. 4 position. A hand wheel 44 is used for that purpose to perform that transverse displacement of the counterweight. The hand wheel 44 actuates a spindle and can thus provide for displacement of the counterweight 24 on the blade root receiving means 40. A first arresting means 46 is provided for fixing in the first position for transport and the second arresting means 48 is provided for fixing in the second position for travel when empty. The arresting means 46, 48 prevent both displacement of the counterweight 24 and also tipping thereof out of the blade root receiving means 40. There is also an abutment 50 which limits the displacement of the counterweight towards the central position.

Figure 5:
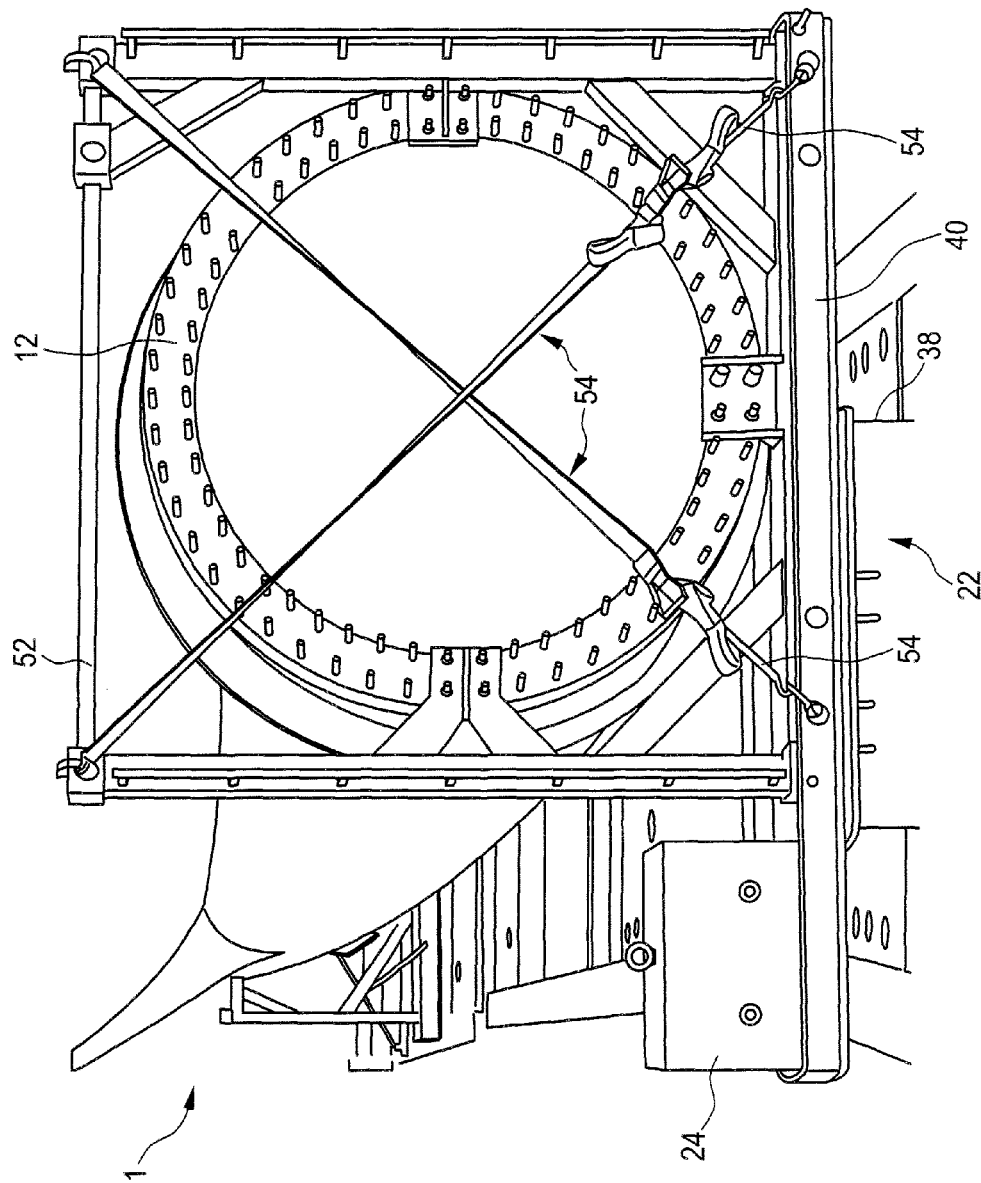
FIG. 5 shows a transport arrangement according to an embodiment of the invention with a blade root carrier in the foreground.

FIG. 5 shows a transport arrangement 1 in a view on to the root region 12 of the rotor blade 10. The root region 12 is fixed in a frame structure 52. That frame structure can also be used for the transport of the rotor blade 10 on other transport vehicles. The frame structure 52 sits on the blade root receiving means 40 of the blade root carrier 22 and is clamped thereto by way of lashing belts 54. The rotary stool 38 indicates approximately the center of the first wagon element 2. The counterweight 24 is correspondingly arranged in its transport position.

Figure 6:
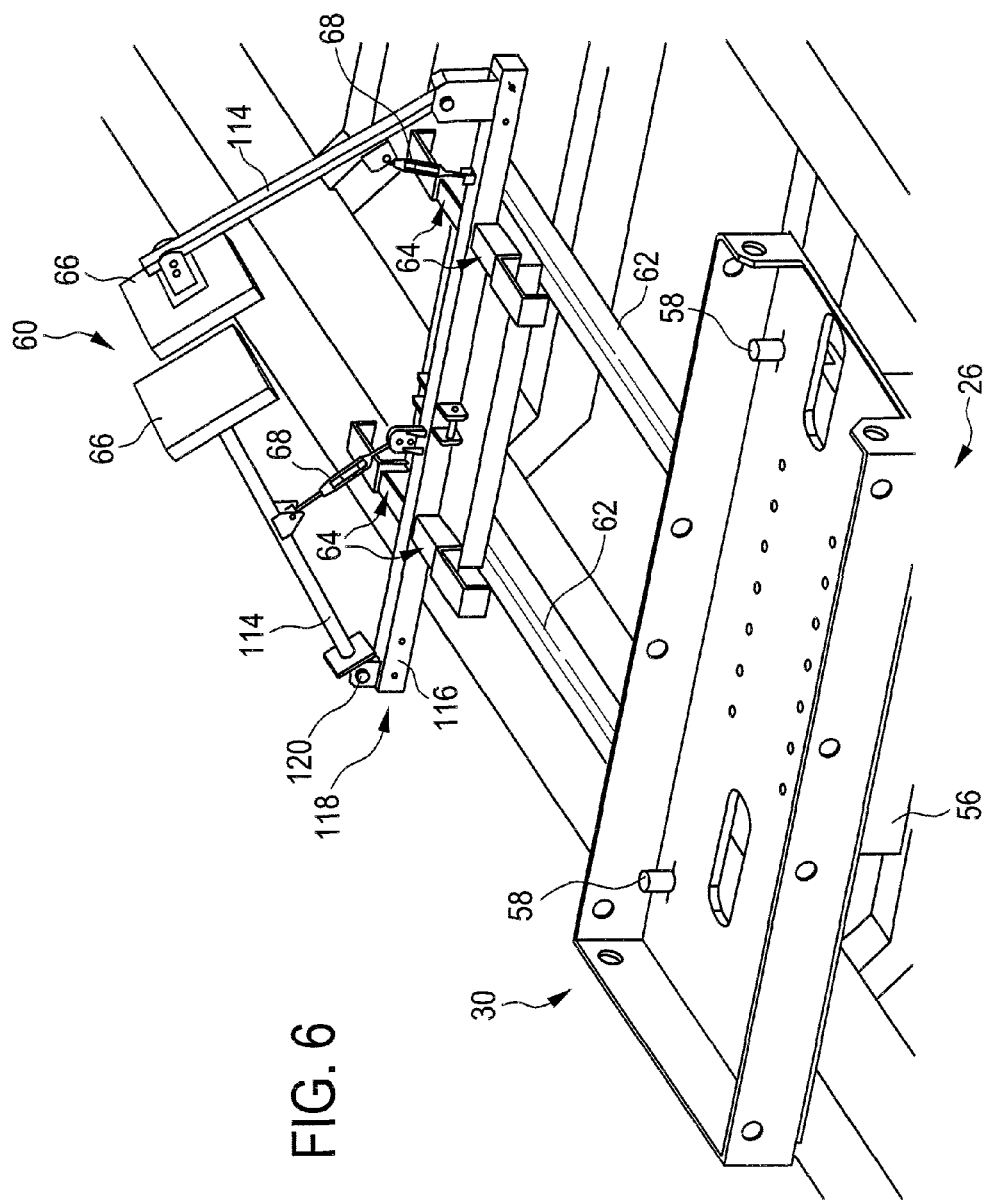
FIG. 6 shows a central carrier of a transport apparatus according to an embodiment of the invention.

The central carrier 26 in FIG. 6 has a central carrier receiving means 30 arranged on a rotary sliding stool 56. The central carrier receiving means 30 is provided with anti-slip mats and has centering elements 58.

There is also provided a waggling support 60 fixedly connected to the central carrier receiving means 30 by way of connecting carriers 62. The support 60 has counterweights 64 and is disposed displaceably in a further region of the second wagon element. The support 60 has two pressure plates 66 in order to clamp the rotor blade to be transported firmly therebetween and in particular to prevent severe movements of the rotor blade. It will be seen that the pressure plates 66 are set in an inclined position as shown in FIG. 6 because the rotor blade to be transported is also to be received in a correspondingly inclined position. The rotor blade can be fixedly accommodated between the pressure plates 66 by means of clamping screws 68.

The pressure plates 66 are fixed pivotably on a transverse bearer 116 by way of support arms 114. The clamping screws 68 can also be released to pivot the support arms 114 away for inserting the rotor blade. At any event the transverse bearer 116 ends at a transverse bearer end 118 directly beside an arm pivot 120 in order as far as possible not to exceed the railway loading gauge in the transport procedure.

Figure 7:
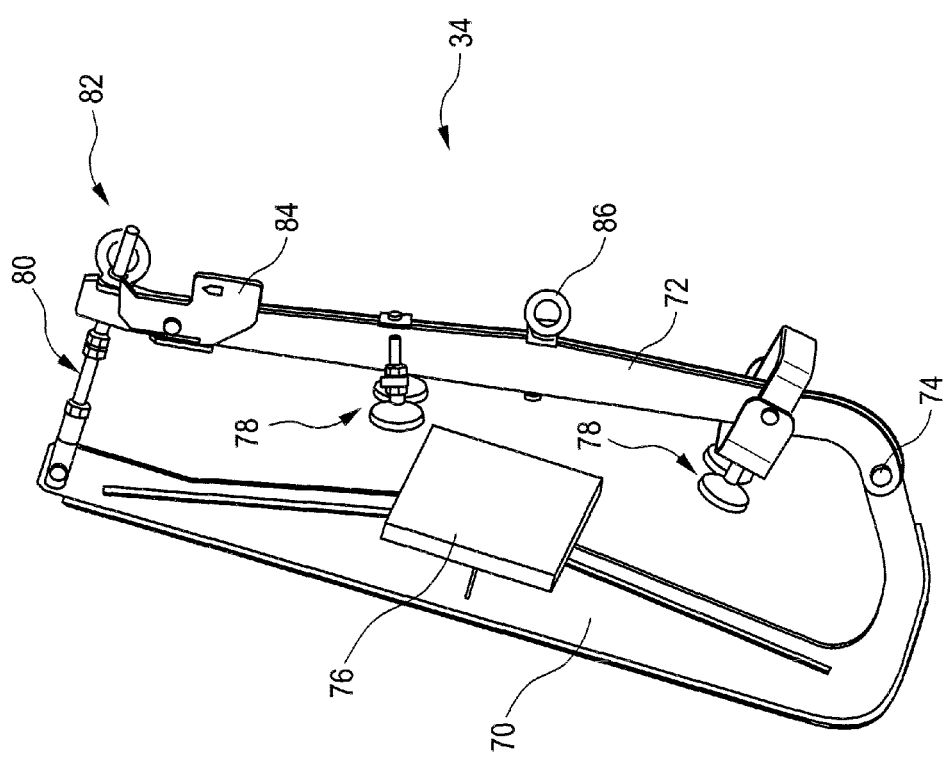
FIG. 7 shows a gripping portion of a blade tip damper according to an embodiment of the invention.

FIG. 7 shows the gripping portion 34 of a blade tip damper. The gripping portion 34 has a first and a second strut 70, 72 which are movably connected together by way of a hinge 74. The first strut 70 has a pressure plate 76 and the second strut 72 has four pressure portions 78. The rotor blade in the region of the rotor blade tip is to be correspondingly received between the pressure plate 76 and the pressure portions 78. For firmly tightening the arrangement, the assembly has a tie rod 80 together with a clamping nut 82. The gripping portion 34 can be opened in the region of the tie rod 80 by means of the latch 84 in order to be able to better fit the gripping portion to a rotor blade. A tensile connection can then be fixed to the fixing ring 86, for example a cable, for connection to a damping portion.

Figure 8:
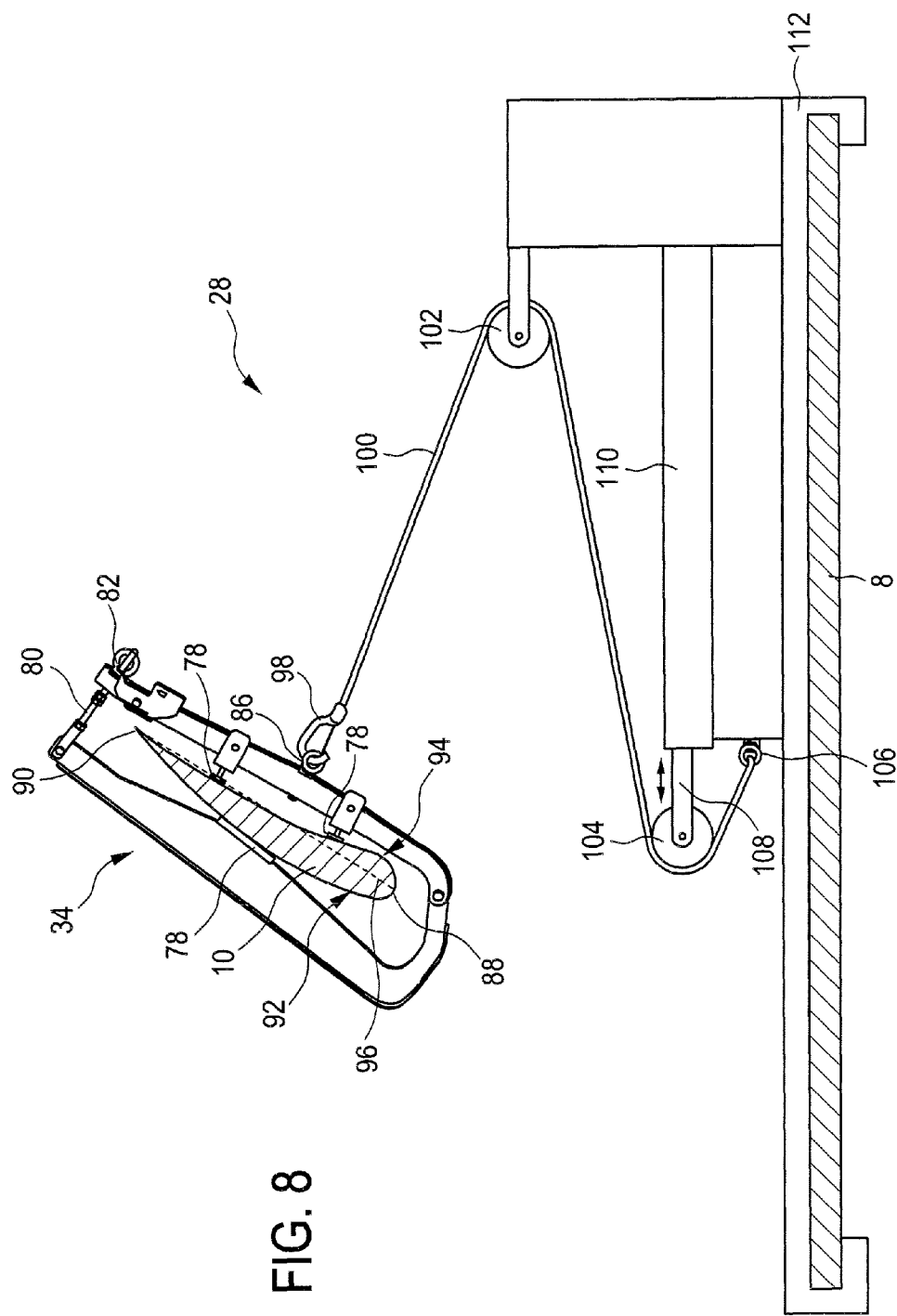
FIG. 8 diagrammatically shows a blade tip damper according to an embodiment of the invention in an appropriate arrangement of a transport arrangement.

FIG. 8 diagrammatically shows a side view of a blade tip damper 28, wherein a part of the rotor blade 10 and of the third wagon element 8 are shown in section. The gripping portion 34 is fixed to the rotor blade 10. In this case the rotor blade 10 is fixedly received between the pressure plate 76 and the pressure portions 78. The nut 82 on the tie rod 80 is firmly tightened. It will be seen that the gripping portion 34 avoids any contact with the rotor blade leading edge 88. Fixing is effected exclusively by way of the suction side 92 and the pressure side 94 of the rotor blade. It will also be seen that the rotor blade 10 is in an inclined position with its chord 96, with respect to the third wagon element 8 and thus the horizontal.

A cable 100 is fixed to the fixing ring 86 of the gripping portion 34 by means of a hook 98. The cable 100 is passed around a first direction-changing roller 102 to a second direction-changing roller 104 and finally to a cable fixing 106. The direction-changing roller 104 is connected to a movable piston 108 guided in a spring damping unit 110. The spring damping unit has both a spring element and also a damping element to which the piston 108 is connected. The spring damping unit 110 with the piston 108 can be viewed as a damping portion 109.

The spring damping unit 110 is fixedly secured to the third wagon element by means of a fixing device 112 which can also be referred to as an anchoring portion 112. The first direction-changing roller 102 is also fixedly connected to the fixing device 112 and thus in the properly set-up arrangement is also fixedly connected to the third wagon element 8.

The piston 108 is pressed somewhat into the spring damping unit 110 against a spring force of the latter. In that way a pulling force is applied by way of the cable 100 to the fixing 86 and thus the gripping portion 34 and thus by way of the pressure plate 78 to the rotor blade tip. In that respect the blade tip damper is prestressed in the illustrated arrangement.

If now the rotor blade 10 performs an oscillatory movement in a direction towards the first direction-changing roller 102 in the region of the tip of the rotor blade, that allows the piston 108 to come further out of the spring damping unit 110. When now the rotor blade tip moves back again, that is to say away from the first direction-changing roller 102, it has to do that against the damping action of the resilient damping unit, whereby oscillations are already prevented at the outset.

When being transported the rotor blade is to be so arranged that—in the case of transport by rail or with the railway—the rotor blade fits into the 'railway loading gauge' which is predetermined by the railway, that is to say it is disposed where no obstacles are likely to be built beside/over the rails. That also corresponds to a usual type of problem when dealing with bulky goods which exceed the normal load dimension of the railway. In particular the tip—insofar as a modern rotor blade with an angled rotor blade tip is used—faces inclinedly upwardly. The blade cross-section shortly before the tip end is disposed somewhat over the wagon center, that is to say over a central longitudinal axis of a wagon and thus basically over the middle between the rails. That is intended to provide that, in the case where the blade oscillates, there is at the most at one side the risk of going outside the railway loading gauge. In addition fixed/loose mounting on a rotary stool (in the case of the blade root carrier) and a rotary sliding stool (in the case of the central carrier) is used. Such a necessity can arise in relation to loads which are on more than one wagon in order to compensate for changes in length when negotiating a bend and in acceleration or deceleration situations by virtue of the sprung buffers. It is possible to achieve a continuous 'transport chain' by the rotor blade being transported from the factory to the building site on a frame by heavy goods vehicle, rail and/or ship. The rail wagons are equipped with adaptors for those frames, namely with the blade root carrier and the central carrier. Container corners are provided on the frame—or frames as at any event two basically mutually independent frames are used for a rotor blade—for ease of handling, including lifting and lashing. In addition the arrangement permits stackability which can be used both upon storage and also in transport by sea or transport on inland waters.

According to the invention there is provided a blade tip damper which can also be referred to as the tip damper. That is intended to ensure that the tip end is not deflected excessively far away from the central axis of the wagon. The tip damper is in that respect so designed that it provides for a gradual build-up of a restoring force. In addition its behavior is at any event in one embodiment non-linear, insofar as firstly a spring action is achieved by a spring. With a further deflection amplitude, a rubber buffer is reached in particular by a corresponding piston and upon still greater deflection finally a metal abutment condition is reached. Nonetheless the tip damper is preferably so designed that it does however allow deflection in bends within limits. Basically the tip damper in a preferred embodiment acts at one side as the rotor blade is only pulled in the region of the rotor blade tip. Because of the selected blade position, in particular the inclined positioning thereof and the advantageous arrangement thereof in the railway loading gauge, a one-sided action has been found to be adequate. The transmission of force by the spring damping element or the spring damping unit is effected by a cable. Oscillation build-up is prevented by damping, in which respect preferably hydrodynamic dampers are used, which act in one direction, insofar as the deflection of the blade from the central position is damped in one direction, but the restoring movement is not, because the cable used only transmits pulling forces. In addition friction has a damping effect.

Preferably a cable transmission is used to make advantageous use of the available structural space. Transmission between cable and a piston of the damping portion affords a 1:2 transmission ratio, the blade travel corresponding to double the damper travel or double the spring travel.

For rapidly fixing the blade tip damper to the rotor blade, a gripping portion is provided which can be arranged by folding shut a loop and closing a clamping nut, whereupon the cable can be hooked into engagement, for which purpose for example a small crane hook can be used. The application of force to the blade is in the form of a pressure force, in particular by way of a pressure plate. The sensitive edge is in that case completely relieved of load and the cable is so arranged that there are few force components acting on the edge of the blade profile. The effect of the tip damper can already be deployed from about 100 mm deflection of the blade tip in a direction, in particular the non-critical direction.

The transport apparatus is arranged for example on a wagon assembly with four low-loader wagons Uiks 635 with a rotary stool and a rotary sliding stool which are available from the corporation HCS (Heavy Cargo Systems). For transporting three rotor blades in combination, ten low-loader wagons may be sufficient.

Figure 9:
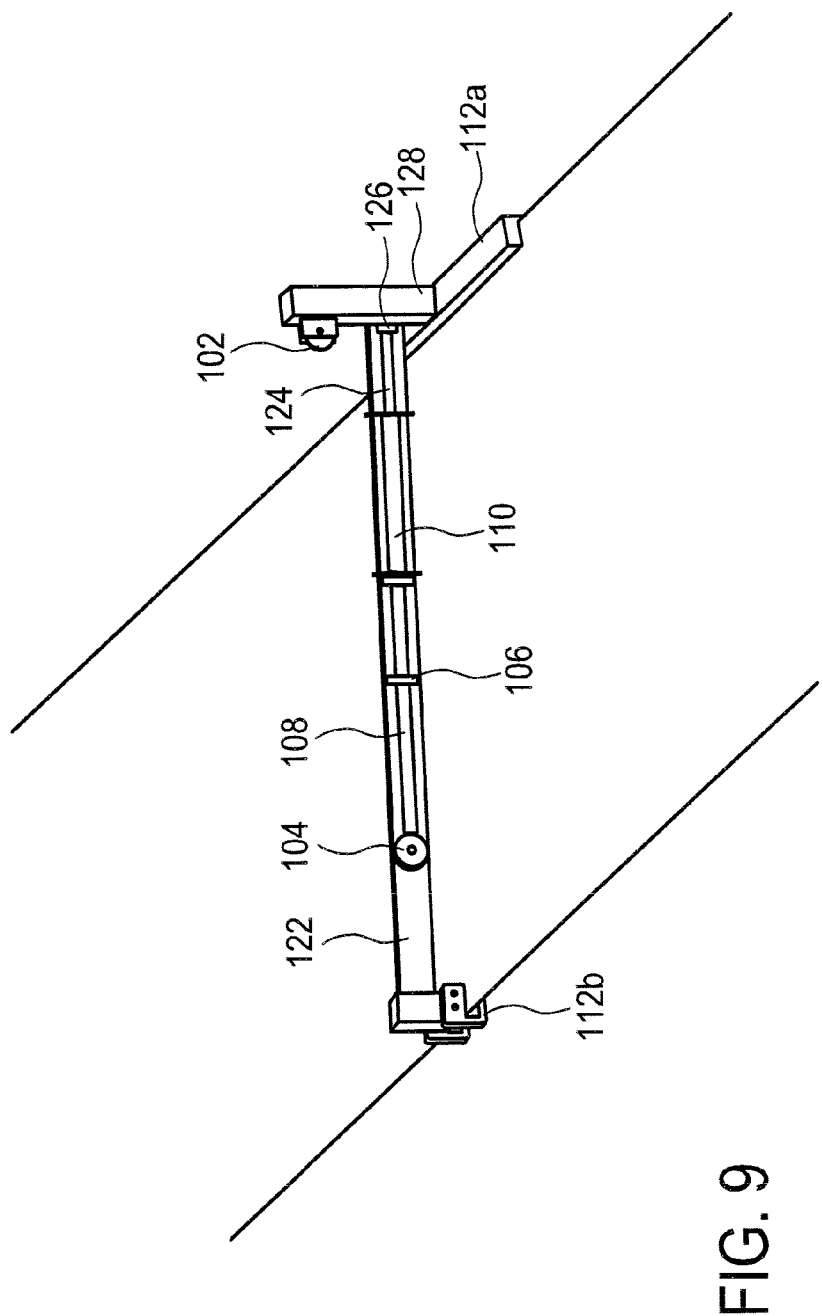
FIG. 9 shows a part of a blade tip damper including a damping portion.
Figure 70:
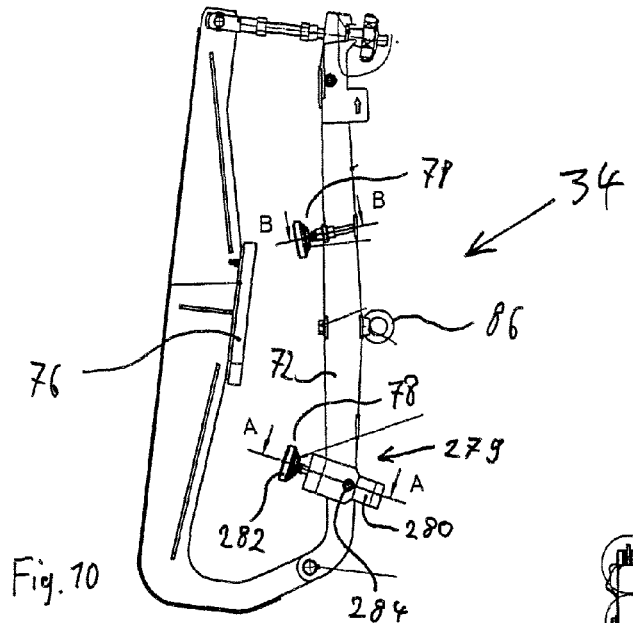
Figure 72:
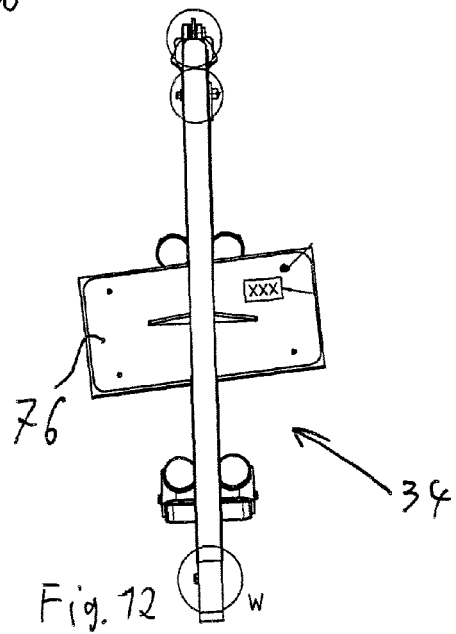
Figure 71:
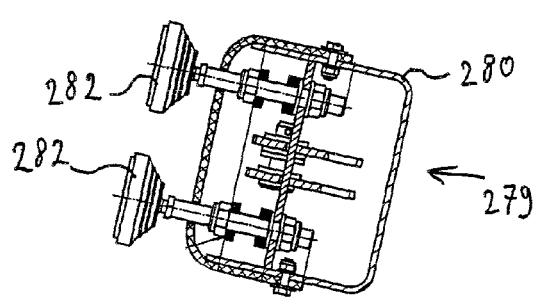
Figure 73:
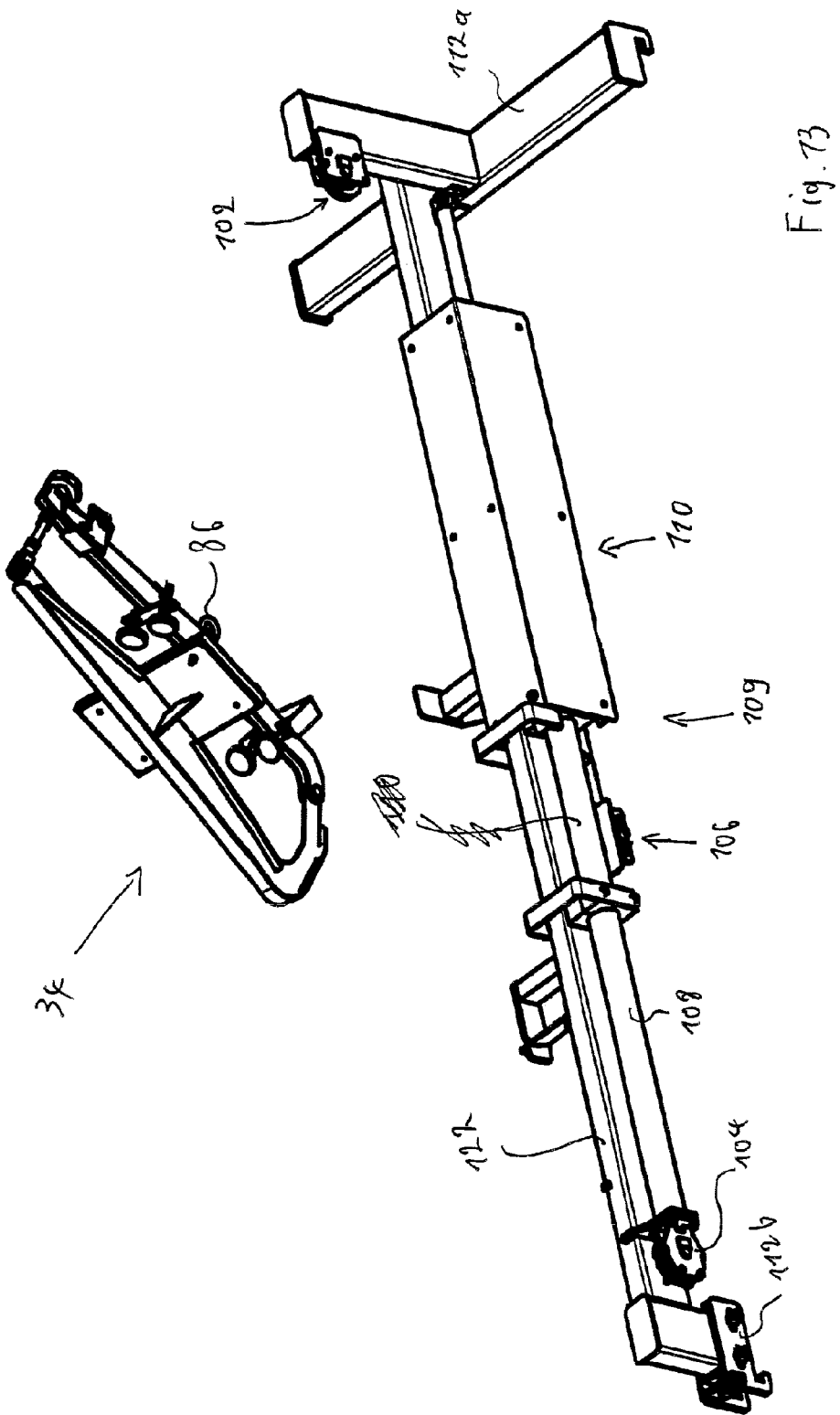
Figure 74:
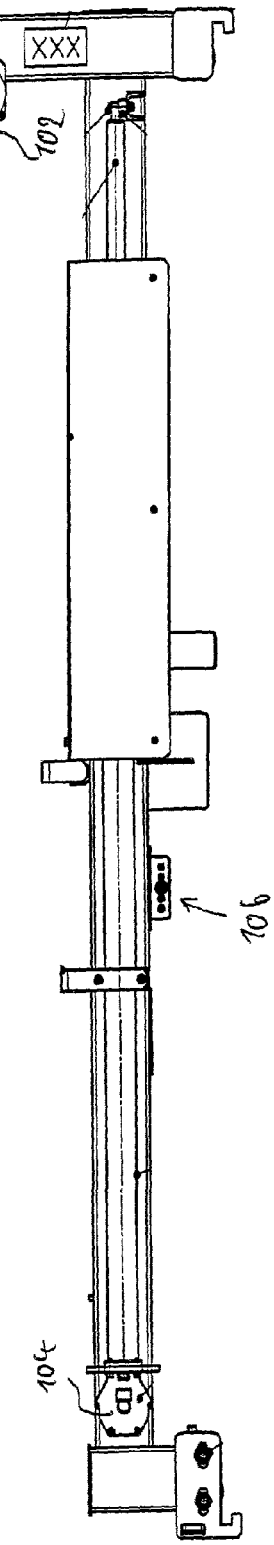

Referring to FIG. 9 the spring damping unit 110 is fixed to a damper carrier 122 which forms a part of the anchoring portion 112, which basically completely spans over the third wagon element 8 and is fixed thereto with a wide fixing device 112a and a narrow fixing device 112b. A cable which is not shown in FIG. 9 would be passed over the first direction-changing roller 102 and the second direction-changing roller 104 and fixed to the cable fixing 106. The second direction-changing roller 104 is fixed to the piston 108 and can correspondingly displace same into the spring damping unit 110. To adjust the damping or braking action of the damping portion 108, 110 an adjusting element 124 which can also be referred to as a brake can be rotated about its own longitudinal axis.

Thus incorporated in the tip damper is a hydraulic brake which brakes when the tip damper is pushed together, that is to say when the piston 108 is pushed into the spring damping unit 110, corresponding to a pull on the cable, and which does not exert any force when the arrangement moves apart, when the cable is slackened. The braking force should be set once upon installation. For that purpose the cable is to be relieved of load and the piston 108 which can also be referred to as the damper tube is to be pulled out to reach the abutment at the second direction-changing roller 104 which can also be referred to as the direction-changing head. A fixing screw 126 with corresponding contact means 128 of the hydraulic brake 124 is to be dismantled and a housing tube of the brake 124 as shown in FIG. 9 is to be pulled out towards the right until the condition of abutment.

The housing tube is firstly to be rotated under a steady pull towards the right (as shown in FIG. 9), to the left as far as the condition of abutment. The brake now has to be pushed together with a slight force. Then the brake is to be rotated towards the right under a steady pressure outwardly for example through two revolutions. Finally the contact means 128 and the fixing screw 126 are to be re-fitted.

The same references can denote the same but also similar non-identical elements in the present description. It is pointed out that Figures—such as for example FIGS. 13-16—can represent different perspectives of an element, in which respect the scale can also vary between those Figures. In other words, one and the same element can appear in one Figure larger or smaller than in another Figure.

The gripping portion 34 in FIG. 10 is shown in a side view similarly to the perspective view in FIG. 7. To describe the individual elements, attention is also directed to the description relating to FIG. 7 hereinbefore. In addition reference is made to the pressure portion arrangement 279 which has a pivotal frame 280 which bears two pressure rams 282 for pressing in appropriate use against a rotor blade. The pressure portion arrangement is fixed to the second strut 72 pivotably about an axis of rotation 284. FIG. 10 shows a section line A-A through the pressure portion arrangement 279 and a corresponding partial sectional view is shown in FIG. 11. It is possible to see therefrom in particular the structure of the pivotal frame 280 and the mounting of two pressure rams 282.

FIG. 12 shows a further view of the gripping portion 34, illustrating in particular the size of the pressure plate 76. It is to be noted that the blade tip damper exerts substantially or exclusively a tensile stress on a rotor blade when the rotor blade tip damper is used in the appropriate fashion. That tensile stress is exerted on the gripping portion 34 by way of the fixing 86 and transmitted to the rotor blade by means of the pressure plate 76. Damage to the rotor blade is avoided by the pressure plate 76 having a wide surface. The function of the pressure portions 78 is essentially to generally fix the gripping portion to a rotor blade.

FIG. 13 shows a blade tip damper as a perspective view in its appropriate position for use, namely a position in which the gripping portion 34 is fixed to a rotor blade to be transported. For greater clarity of the drawing however the rotor blade is not shown and the transport vehicle to which the anchoring portion 122 is suitably fixed in operation is also not illustrated. In addition FIG. 13 does not show a view of a cable for connecting the gripping portion 34 to the damping portion 109.

The perspective view in FIG. 13 illustrates the arrangement of the wide fixing device 112a in relation to the narrow fixing device 112b which are connected by means of the damping carrier 122. The two fixing devices 112a and 112b are fixed on both sides to a contact plate or the like of a transport apparatus. In particular the wide fixing device 112a also prevents rotation of the fixed arrangement.

The damping portion 109 is fixed to the damping carrier 122. It essentially has a piston 108 which is received in a spring-damping unit 110 and which basically can be pushed thereinto. The piston 108 has a second direction-changing roller 104. From the cable fixing 106, in appropriate use of the arrangement a cable is passed over the second direction-changing roller 104 and over the first direction-changing roller 102 to the fixing 86 of the gripping portion 34. A force directing the piston 108 out of the spring-damping unit 110 thus leads to a tensile loading on the fixing 86 of the gripping portion 34.

FIG. 14 shows a side view of the damping portion 109 which corresponds to the direction of travel or the opposite direction in a transport process as required. In particular the relationship of the cable fixing 106, the second direction-changing roller 104 and the first direction-changing roller 102 is clearly illustrated here.

FIG. 15 shows a plan view of the damping portion 109 which in particular clearly illustrates an arrangement of the piston 108 and the spring-damping unit 110 in parallel relationship with the damping carrier 122. FIG. 15 shows a section line A-A and FIG. 16 shows a side view in section along that section line A-A in FIG. 15.

The view in section in FIG. 16 shows a coil spring 202 which is provided in the piston 108 and the spring-damping unit 110. In addition the assembly has a damper having a cylinder 204 and a piston rod 206. That damper can be for example in the form of a gas pressure damper or a hydraulic damper or a hydraulic brake or can be designed in some other suitable fashion. In addition the piston 108 in the region of the spring-damping unit 110 is provided with an abutment ring 208. When the piston 108 is pushed far into the spring-damping unit 110 the abutment ring 208 reaches a rubber stop ring 210. When the abutment ring 208 reaches the stop ring 210 the piston movement is braked very severely, basically with a jerk, and thus a maximum deflection of the rotor blade is predetermined in the region of the gripping portion 34 fixed thereto. In addition this gives a non-linear effect due to that irregular movement, which acts in opposition to a harmonic oscillation but which in particular does not allow same or allows it with a limited amplitude.

Figure 17:
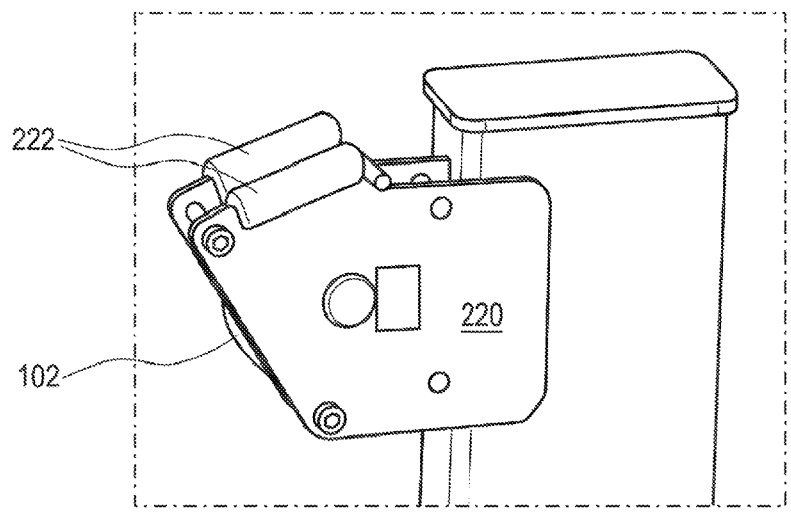
FIG. 17 shows a perspective view of a direction-changing device of a blade tip damper.

FIG. 17 shows a variation in the first direction-changing roller 102 in FIGS. 13 to 16. That first direction-changing roller 102 is arranged between two support plates 220. In that way the first direction-changing roller 102 is advantageously guided and in particular the cable is prevented from jumping off the first direction-changing roller 102. To protect the cable which is guided therein but which is not shown in FIG. 17 and also FIG. 18, the arrangement has two round profiles 222 intended to ensure that even in unusual operating conditions the cable cannot run to the right or the left of the first direction-changing roller 102 over any sharp edges of the support plates 220 which can also be referred to as metal cheek plates. Such unusual operating conditions could possibly occur under heavy braking or when buffers are resiliently retracted, in which case the gripping portion 34 and therewith the corresponding rotor blade portion and in particular the rotor blade tip moves basically in the direction of travel and thus transversely relative to the support plates 220. In addition guidance for the cable and prevention of the cable from jumping out can be improved.

The round profiles can comprise abrasion wear-resistant material. For example they can comprise metal and can be welded on for durable fixing.

Figure 18:
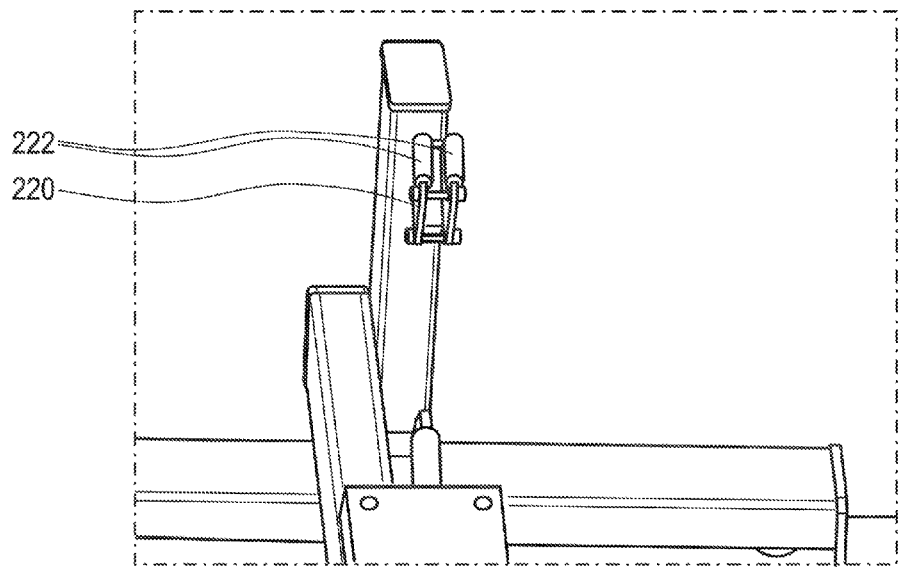
Figure 79:
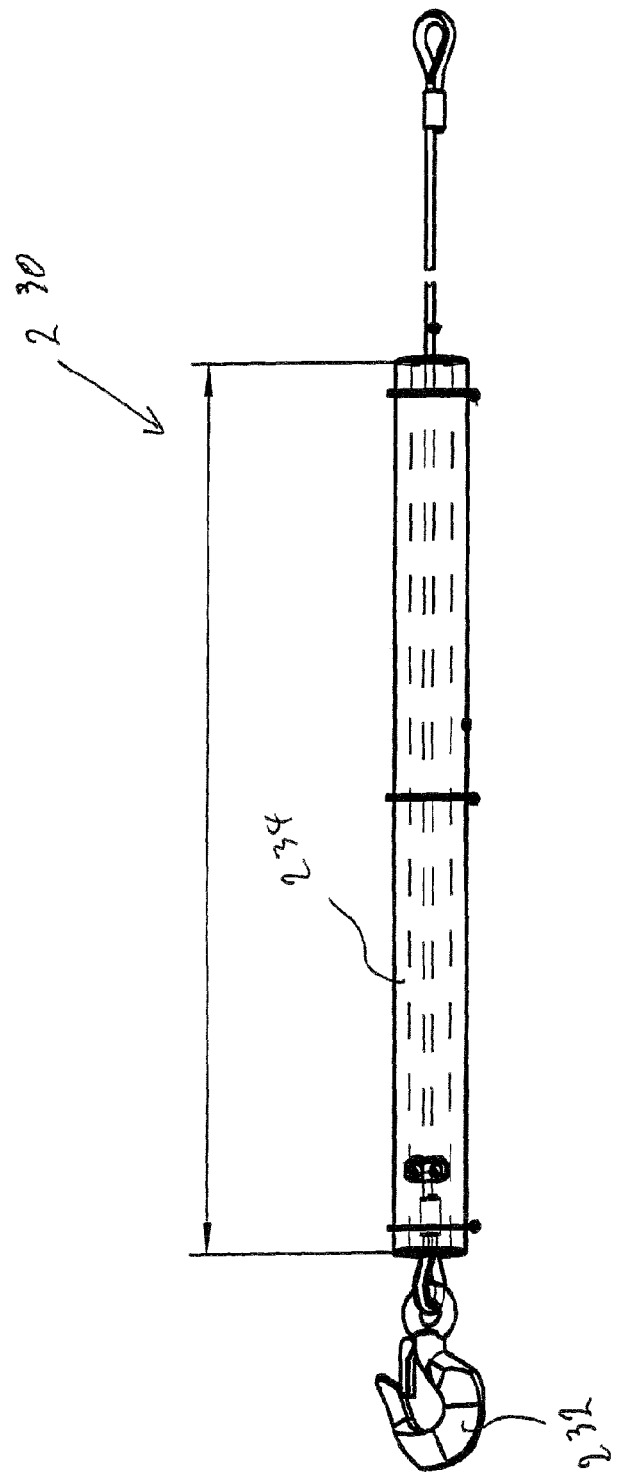

FIG. 18 shows another perspective of the support plates 220 and the round profiles 222 arranged thereon. The perspective view in FIG. 18 approximately corresponds to a direction of view of a gripping portion 34 which is arranged in the appropriate manner on a rotor blade intended to be transported.

FIG. 19 shows a cable portion 230 having a hook 232 for fixing to a corresponding gripping portion. The cable portion 230 has a sheathing 234. That can serve on the one hand as protection for the cable or cable portion 230 and conversely for protecting the elements, including the rotor blade, against which the cable portion 230 could hit when being transported in the appropriate fashion.

The various embodiments described above can be combined to provide further embodiments. All of the U.S. patents, U.S. patent application publications, U.S. patent application, foreign patents, foreign patent application and non-patent publications referred to in this specification and/or listed in the Application Data Sheet are incorporated herein by reference, in their entirety. Aspects of the embodiments can be modified, if necessary to employ concepts of the various patents, application and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A transport apparatus for transporting a rotor blade of a wind power installation on a transport vehicle that includes a plurality of successively arranged and pivotably interconnected wagon elements, the transport apparatus comprising:
   a blade root carrier adapted to attach to a first wagon element of the transport vehicle for carrying the rotor blade in a region of a rotor blade root thereof on the first wagon element;
   a central carrier adapted to attach to a second wagon element of the transport vehicle for carrying the rotor blade in a central region thereof on the second wagon element;
   a gripping portion for fixedly receiving the rotor blade in a region of a rotor blade tip thereof; and
   a blade tip damper coupled to the gripping portion, the blade tip damper being configured to make an elastic connection between a third wagon element of the transport vehicle and the rotor blade tip and to damp vertical oscillations of the rotor blade tip without supporting the rotor blade.

2. A transport apparatus according to claim 1 wherein the blade tip damper includes a piston and a biased spring, the piston being configured to move relative to the biased spring when damping oscillations of the rotor blade tip.

3. A transport apparatus according to claim 1 wherein the blade tip damper is adapted to build up a tensile stress between the rotor blade and the third wagon element.

4. A transport apparatus according to claim 1 wherein the blade root carrier has a counterweight so that the rotor blade can be arranged eccentrically in the region of the rotor blade root in relation to a central axis of the transport vehicle.

5. A transport apparatus according to claim 1 wherein the transport apparatus is adapted to transport a rotor blade of a length of at least 25 m.

6. A transport apparatus according to claim 1 wherein the blade tip damper comprises:
   an anchoring portion to fix the blade tip damper to the transport vehicle;
   the gripping portion to fix the blade tip damper to the rotor blade in the region of the rotor blade tip; and
   a damping portion for producing an elastic damped connection between the anchoring portion and the gripping portion.

7. A transport arrangement for securing a rotor blade of a wind power installation to a multi-link vehicle having at least a first and a second wagon element which are pivotably connected together, the transport arrangement comprising:
   a blade root carrier adapted to attach to the first wagon element, and wherein the rotor blade in a region of a rotor blade root thereof is fixed on the blade root carrier on the first wagon element and is carried thereon;
   a central carrier adapted to attach to the second wagon element, and wherein the rotor blade in a central region is fixed on the central carrier on the second wagon element and is carried thereon;
   a gripping portion having an opening for receiving and gripping the rotor blade in a region of a rotor blade tip thereof; and
   a blade tip damper coupled to the gripping portion, the blade tip damper being configured to make an elastic connection between a region of the rotor blade tip of the rotor blade and the multi-link vehicle and to damp vertical oscillations of the rotor blade tip without supporting the rotor blade.

8. A transport arrangement according to claim 7 wherein the rotor blade has an angled blade tip which faces inclinedly upwardly.

* * * * *